United States Patent [19]
McDonnell et al.

[11] Patent Number: 5,347,770
[45] Date of Patent: Sep. 20, 1994

[54] EXTENDABLE MAST SUPPORT SYSTEM

[75] Inventors: Michael P. McDonnell, Unley Park; Johannes J. W. Althoff, North Plympton, both of Australia

[73] Assignee: Polytech Technical Services Pty. Ltd., Australia

[21] Appl. No.: 961,907

[22] PCT Filed: Jul. 16, 1991

[86] PCT. No.: PCT/AU91/00313

§ 371 Date: Mar. 2, 1993

§ 102(e) Date: Mar. 2, 1993

[87] PCT Pub. No.: WO92/01851

PCT Pub. Date: Feb. 6, 1992

[30] Foreign Application Priority Data

Jul. 16, 1990 [AU] Australia ............................ PK 1176

[51] Int. Cl.⁵ ............................................ E04H 12/18
[52] U.S. Cl. ....................................................... 52/108
[58] Field of Search .................. 52/108, 111, 121, 146; 474/207

[56] References Cited

U.S. PATENT DOCUMENTS

| 2,554,300 | 5/1951 | Hayakawa | 52/108 |
| 3,012,635 | 12/1961 | Blain | 52/108 |
| 4,863,418 | 8/1989 | Fillar et al. | 474/207 |
| 4,866,893 | 9/1989 | McGinnis | 52/108 |
| 5,025,606 | 6/1991 | McGinnis | 52/108 |

FOREIGN PATENT DOCUMENTS

| 62-39286 | 3/1987 | Australia |  |
| 1136948 | 1/1957 | France | 52/108 |
| 1425887 | 12/1965 | France | 52/108 |
| 64-58833 | 3/1989 | Japan |  |

Primary Examiner—James L. Ridgill, Jr.
Attorney, Agent, or Firm—Webb, Ziesenheim, Bruening, Logsdon

[57] ABSTRACT

The invention relates to an extendable mast or column assembly comprising a pair of interengaging elongate link chains (13, 14), each link chain comprising a plurality of pivotally interconnected chain link elements (17), the adjacent interconnected link elements (17) of the individual chains (13, 14) having interfitting walls which permit relative pivotal movement from an axially in line position in one direction only, at least some of the link elements (17) having abutment surfaces (23, 24, 34) which, when the chains are interengaged, cooperate with one another to provide interlocking means for preventing relative movement between the link elements of one chain and adjacent link elements of the other chain, and chain drive means (46) for interengaging the chains (13, 14) and driving the chains, so interengaged, in an upwards direction to form the rigid mast or column (10). Guy wires (66) may be employed to ensure that the mast (10) is held secure when in an elevated condition.

13 Claims, 5 Drawing Sheets

EXTENDABLE MAST SUPPORT SYSTEM

BACKGROUND OF THE INVENTION

1. Field of the Invention

This invention relates to an improved extendible beam or column system, and in particular to an extendible mast for supporting an antenna, and also to an improved method of erecting same.

The invention-will have many applications, such as antenna support masts, ladders, booms or any other elongate rigid column member used as a support structure. However, the invention will be described in relation to antenna support masts, realising that the scope of the invention is not to restricted to this application.

2. Background Information

Antenna support masts or towers comprising a plurality of telescopic sections telescoped one within the other, and which are normally operated by means of a hand pump are well known and in common use for antenna systems required for field use, e.g. by army personnel. Such mast systems suffer from a number of disadvantages. They are relatively expensive and not very reliable in use due to the tendency of the telescoping sections to "stick" on the seals when raising or lowering them by means of the pump. This can slow down quite significantly both the erection and the pulldown time which in some situations, e.g. military operations, may be quite critical. Furthermore, the cables leading to the antenna are required to be carried externally of the tubular telescoping sections and hence are prone to damage both during use of the antenna and transportation thereof. A still further disadvantage is their relatively heavy weight which renders their handling more difficult.

It is the main object of the present invention to provide an improved extendible column or mast for supporting an antenna, especially for those used in the field, which obviates at least some of the aforementioned disadvantages, and in particular one which is able to be very quickly erected and pulled down, and which is able to be easily repaired in the field.

It is a further object of the present invention to provide an extendible mast which can be constructed so that it is less likely to fail during operation in adverse environmental conditions, e.g. heat, salt spray and dust in comparison to known mast systems of a similar type.

SUMMARY OF THE INVENTION

In one of its forms therefore, this invention provides an extendible column or mast assembly comprising a pair of elongate link chains arranged to interengage with one another so as to form a rigid mast or column, each said chain having a plurality of pivotally interconnected chain link elements, wherein each said link element of each said chain (apart from its leading and trailing link elements) is pivotally connected to a pair of adjacent said elements in its own chain by first and second spaced apart pivot means, said adjacent interconnected link elements having interfitting walls constructed and arranged to permit relative limited pivotal movement from an axially in-line position in one direction only and preventing pivotal movement in the opposite direction of said one direction from said in-line position, and wherein at least some of said link elements in said chains have abutment surfaces which, when the chains are interengaged, co-operate with one another to provide interlocking means for preventing relative movement in horizontal planes between link elements of one chain and adjacent link elements of the other chain, and chain drive means for interengaging the chains and for driving the chains, so interengaged, in an upwards direction to raise the rigid mast or column or in a downwards direction to lower the mast or column.

Preferably the chain links of each chain are moulded of high strength plastics material and are identical with one another. Depending on load requirements, the material can be a low-grade composite plastic or a carbon fibre composite.

Preferably, the drive means is contained in a portable base frame which can be easily transported in or on a vehicle and readily handled manually in the field.

The drive means may conveniently be a gear drive unit manually operated by a crank handle, and which comprises a pair of driven cog wheels mounted for rotation on the base frame adjacent the foot of the mast, arranged to respectively mesh with the link elements of the chains whereby, upon rotation of the cog wheels, the link elements intermesh and the chains are simultaneously elevated in a vertically upwards direction to thereby form the mast. The mast can be lowered by simply rotating the cog wheels in the opposite direction, whereupon the links of the chains are separated and are returned to respective opposite locations adjacent the base frame in a straightened or reeled condition.

Depending on the height requirements for the mast, it may be necessary to utilise separate securing means, such as guy ropes or wires in order to firmly hold the mast in position (e.g. against wind loading). Preferably, a guy securing system is operatively associated with the drive means so that as the mast is raised, the guys are pulled out from respective reels or drums at the rate of ascent of the mast to thereby ensure that the mast is held in a perpendicular position with respect to its base whilst it is being elevated.

According to another aspect of this invention there is provided a link chain formed by a length of pivotally interconnected link elements which are arranged to mesh with identical link elements of a separate length of link chain, wherein each said link element of said link chain (apart from its leading and trailing link elements) is pivotally connected to a pair of adjacent said elements by first and second pivot means axially spaced apart with reference to the longitudinal axis of the chain, said adjacent interconnected link elements having interfitting walls constructed and arranged to permit relative pivotal movement from an axially in-line position in one direction only and preventing pivotal movement in the opposite direction of said one direction from said in-line position, and wherein said link elements have a first set of abutment surfaces which face into the interior of said link element and extend in a direction parallel to the pivot axis of said pivot means, and a second set of abutment surfaces facing laterally outwards of the link element and which extend in a direction perpendicular to said pivot axis, constructed and arranged so that when the link elements of the chain meshingly engage with adjacent link elements of a separate link chain, the abutment surfaces co-operate with abutment surfaces on said adjacent link elements to form interlocking means for preventing relative movement in horizontal planes between the link elements of one chain and the adjacent meshing link elements of the other chain.

According to yet another aspect of this invention, there is provided a method of erecting an extendible mast or column from a base assembly comprising the steps of:

providing two separate lengths of link chain, each chain comprising a plurality of pivotally interconnected chain link elements, the link elements of one chain being arranged to interengage with the link elements of the other chain, engaging the link elements of each said chain with drive means carried on said base assembly, and activating the drive means for driving the chains, so interengaged, in unison in an upwards direction so as to form a rigid mast or column.

Preferably, the chains are fed through mutually opposite guide passages formed in a housing of the base assembly, and which lead to the drive means.

Preferably the interengaging chains are guided upwardly from the base through a pair of spaced apart vertical guide members carried on the upper wall of the base.

In use, the mast or column can be very simply erected or pulled down, either through manual or motorised operation of the drive means which preferably comprises cogs which mesh respectively with the lengths of chain.

It is an advantage of the invention that the design of the chain links permits the cables running to the antenna to be located internally of the mast assembly (namely to extend interiorly along the length of the chains). They can therefore be very simply fed in or out simultaneously with the movement of the pair of chains.

Furthermore, in the event of one or more of the links being damaged when the mast is in use, they can be readily replaced with new links "in situ" and the mast re-erected.

BRIEF DESCRIPTION OF THE DRAWINGS

In order to further explain the present invention, an embodiment is described hereunder in some further detail with reference to and is illustrated in the accompanying drawings wherein.

DESCRIPTION OF THE PREFERRED EMBODIMENT

Figure 1:
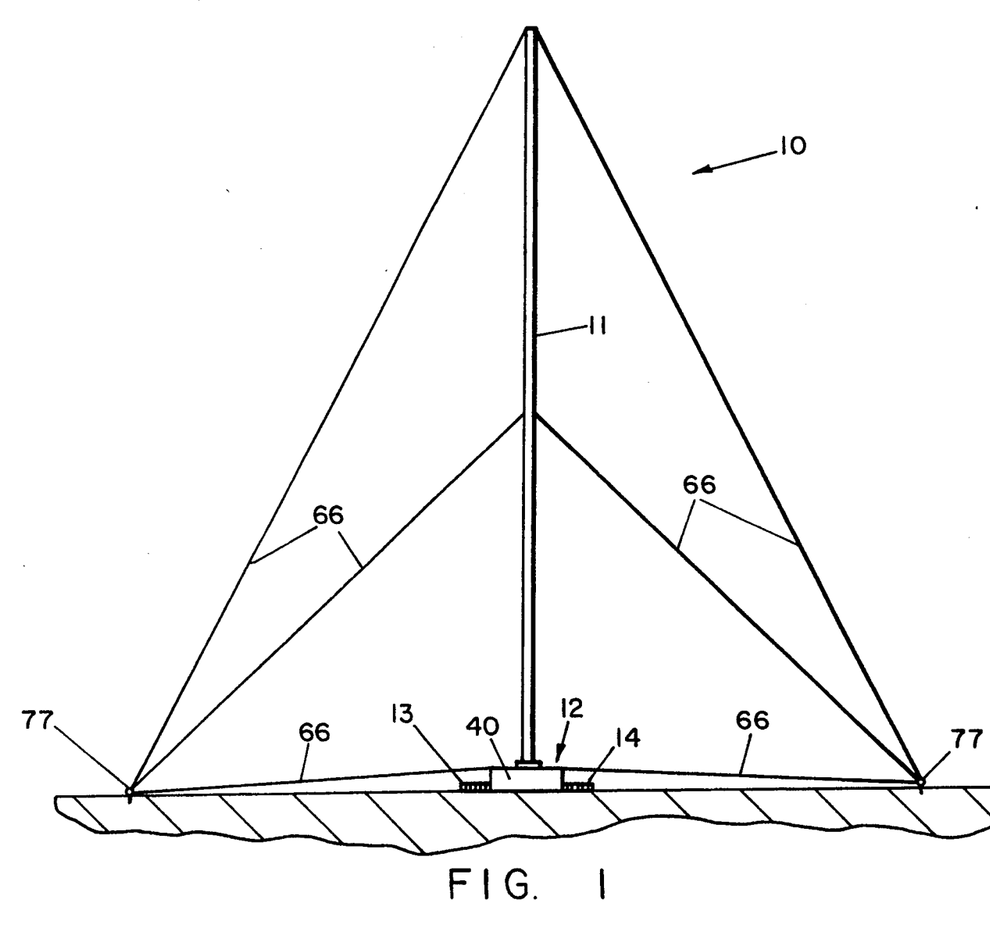
FIG. 1 is a schematic elevational view of an erected mast assembly, together with securing guys, according to one embodiment of the invention.

In this embodiment reference is made to a support mast 10 for supporting an antenna, especially for use in field operations. The mast 10 comprises a self-supportive interlocking chain assembly 11 extending upwardly from a support base 12 which in this embodiment is a portable unit, but can, for example, be mounted to a vehicle. The chain assembly 11 comprises a pair of separate lengths of chain 13, 14 intermeshing with one another, each chain 13, 14 comprising a plurality of pivotally interconnected identical link elements 17 injection moulded of plastics material.

As shown in FIGS. 6 to 9 of the drawings, each of the chain links 17 has a hollow rectangular (in plan) configuration and comprises a pair of opposed side plates 18 which are interconnected by an horizontal intermediate connector web 19 which joins to each of the plates 18 along the full width thereof. The plates 18 are also interconnected by a transverse connector rail 20 which is approximately C-shaped, the lengthwise margins of the rail 20 being formed with oppositely inclined upper and lower edge surfaces 23, 24. Vertical webs 25 located interiorly of the rail 20 and connecting to the web 19 are provided for strengthening purposes.

Each side plate 18 has opposed depending side plate portions or flanges 26 offset relative to the plane of their associated plate 18 and which fit between the plates 18 of an adjacent link 17 at its upper end in such a way that adjacent links 17 of each chain can undergo only relative pivotal movement from an in-line position in one direction only. The engagement between shoulders 27 on the outside of the side plates 18 and respective upper edges 29 of the plates 18 prevents pivotal movement of the links 17 in the opposite direction from the in-line position. Thus, as shown in FIG. 1, each chain 13, 14 forms a straight run in the vertical direction, and the interlocking chains 13, 14 together form a rigid vertical structure, with the links 17 of the chains 13, 14 being in meshing relationship. From FIG. 2, it will be seen that the links 17 of the chains 13, 14 pivot in counter directions as they mesh together at the base 12.

Figure 4:
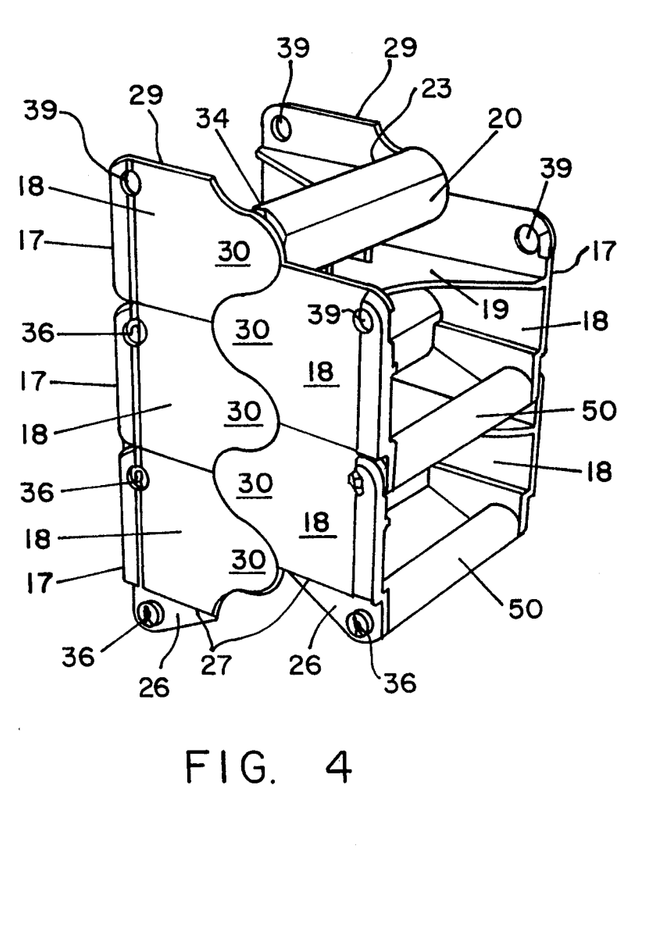
FIG. 4 is a perspective view of a portion of the intermeshing chains shown in FIG. 2.
Figure 5:
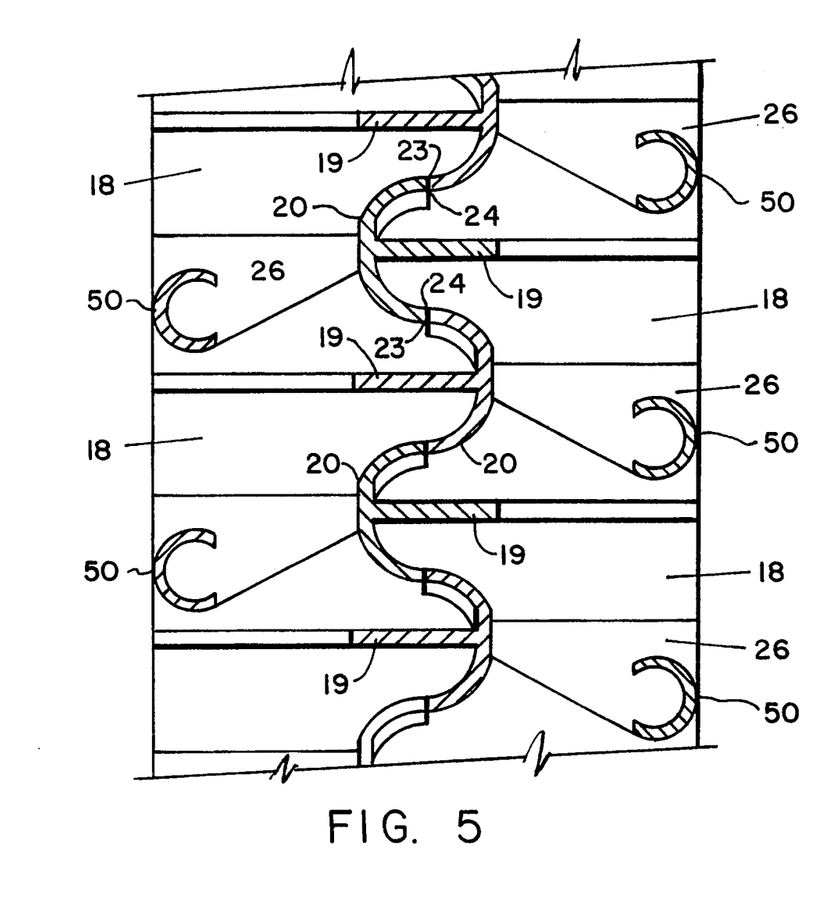
FIG. 5 is a vertical section taken through the meshing chains shown in FIG. 4.
Figure 6:
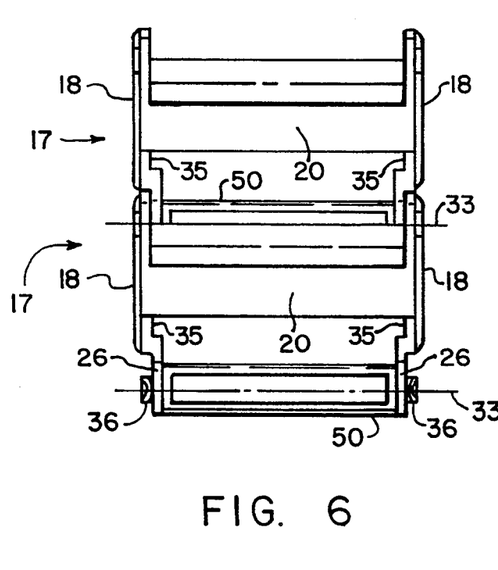
FIG. 6 is a front elevational view of a pair of interconnected link elements shown in FIG. 4.
Figure 7:
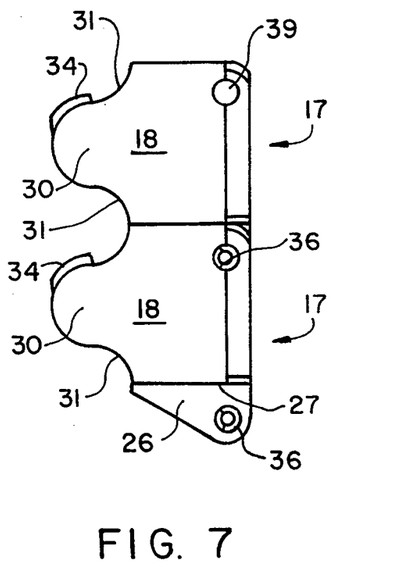
FIG. 7 is a side elevational view of the link elements shown in FIG. 6.
Figure 8:
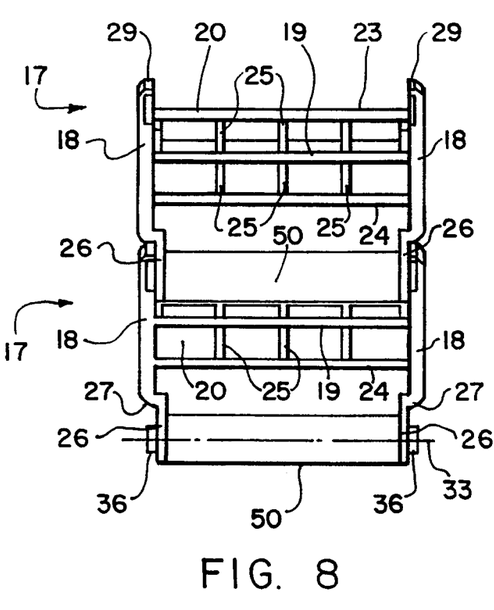
FIG. 8 is a rear elevational view of the link elements shown in FIG. 6.
Figure 9:
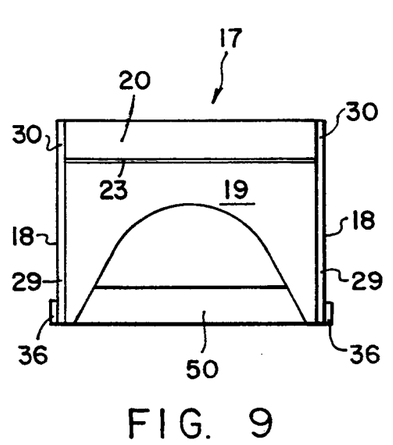
FIG. 9 is a plan elevational view of the link elements shown in FIG. 6.

In order to intermesh the elements 17 of the chains 13, 14, each side plate 18 is provided with an inwardly projecting tooth formation 30 which is flanked on either side by a half meshing void 31, so that each chain 13, 14 has an inner end profile which comprises formations 30 alternating with meshing voids 31 along the length thereof. With the chains 13, 14 intermeshing, the tooth formations 30 of one chain engage within respective meshing voids 31 of the other chain, with the tooth edge surface contiguous with the void-forming flanks. The intermeshing of the chains 13, 14 assist their upward travel during elevation of the mast 10, and of course inhibit the chains 13, 14 against relative movement lengthwise of the mast 10.

The interfitment of the offset side plate portions 26 of one link 17 and the upper wall regions of the side plates 18 of an adjacent interconnected link 17 prevents relative horizontal movement of those links 17 in a direction parallel to the pivot axes 33 thereof.

The meshing chains 13, 14 are locked against relative horizontal movement in a direction at right angles to the pivot axes of the links 17 by virtue of the interlocking engagement between the upper edge surface 23 of the transverse rail 20 of each link element 17, in one of the chains 13, 14 and the lower edge surface 24 of the rail 20 of an opposite adjacent link element 17 in the other of the chains 13, 14, whilst relative horizontal movement in a direction parallel to the pivot axes of the links 17 is restrained by the mating engagement between the raised abutment surfaces 34 at opposite ends of each rail 20 of a link element 17 in one chain and associated inner faces 35 of tooth formations 30 of an opposite link element 17 in the other chain.

The interlocking engagement between the link elements 17 of the meshing chains 13, 14 is effective in providing an extremely rigid structure which is capable of resisting significant deformation forces.

The pivotal interconnection between adjacent links 17 of each chain 13, 14 is made by horizontally aligned projecting cylindrical bosses 36 integrally moulded with the side plate portions 26, the bosses engaging in co-operable aligned holes 39 formed in the opposed side plates 18 adjacent the upper front corners thereof of an adjacent link 17. The offset portions 26 permit the side plates 18 of adjacent connected links 17 of each chain to lie flush with one another. As an alternative to the moulded pivots 36, separate spring-loaded pivot pins removably supported by the plates 18 may be used to pivotally interconnect the links 17. This provides the advantage of being able to separate each of the chains 13, into manageable lengths for ease of transportation. Preferably, both types of pivot connections are used for each of the chains 13, 14.

Figure 2:
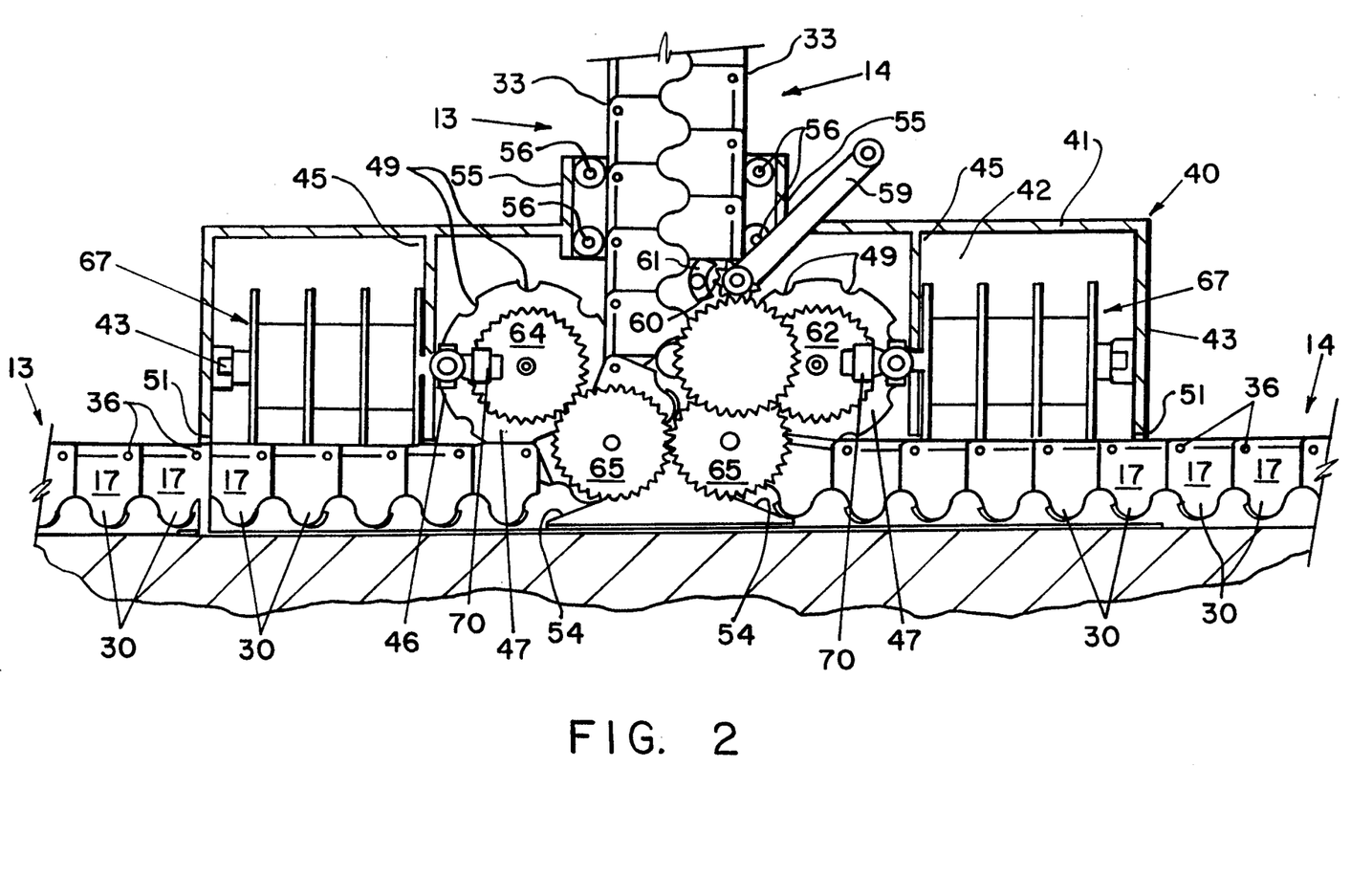
FIG. 2 is a sectioned elevational view of the base structure of the mast which shows the drive mechanism for elevating and lowering the mast shown in FIG. 1, and also the winding drums for the guys (the guys being omitted for sake of clarity)
Figure 3:
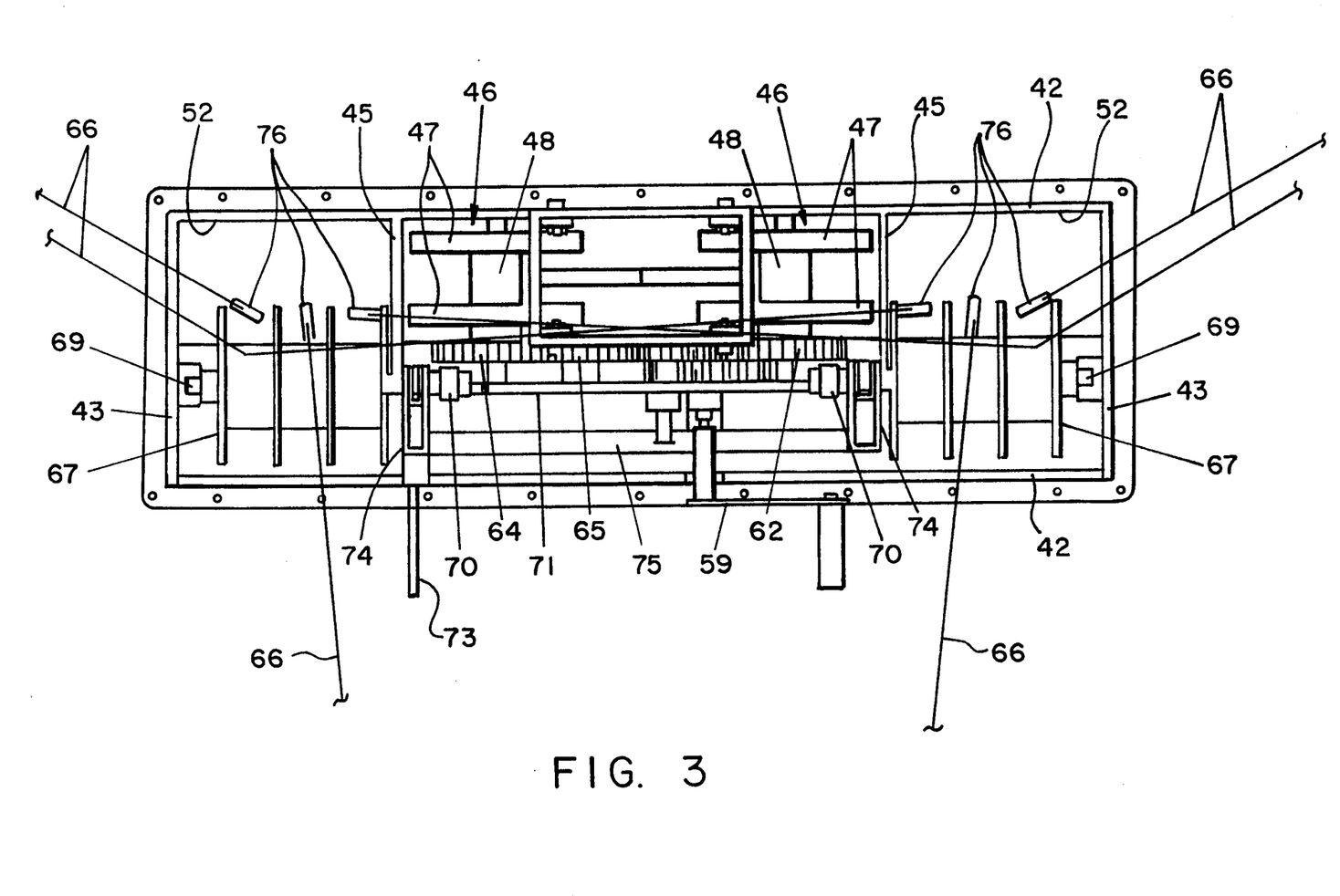
FIG. 3 is a plan view of the assembly shown in FIG. 2 but shows the guys extending from their support drums.

As shown in FIGS. 2 and 3, the base 12 of the mast assembly 10 comprises a housing 40 which includes a top wall 41, side walls 42, end walls 43 and an horizontal base plate 44 which is secured to the lower ends of the vertically disposed side and end walls 42, 43. Internal division walls 45 extend between the side walls 42. The side walls 42 rotatably support a pair of spaced apart horizontally aligned driven cog wheels 46 which can either be manually rotated or driven by power means. Each cog wheel 46 comprises a pair of aligned discs 47 fixed on a shaft 48 for rotation therewith, each of the discs 47 having a plurality of spaced notches 49 formed in its periphery. Each of the cog wheels 46 is arranged to mesh with a respective chain 13, 14 (refer FIG. 2), with the notches 49 receiving the part-circular cross bars 50 of the links 17 so that upon rotation of the cog wheels 46, the links 17 of the chains 13, 14 mesh together as they pass upwardly between the cog wheels 46 and the meshing chains in turn driven upwardly to form a straight vertical run. The two lengths of chain 13, 14 are fed into the cogs 46 from mutually opposite directions, being fed horizontally through openings 51 in the opposite end walls 43 of the housing 40 and through guide passages 52 leading to the cog wheels 46. Guide ramps 54 assist the initial feeding in of the chains 13, 14 into the path of the cog wheels 46, but more importantly are effective to separate the links 17 of the meshing chains as the chains 13, 14 are retracted. The ramps 54 direct the chains in mutually opposite directions which causes the interlocking link elements 17 of the chains to be parted.

Each length of chain 13, 14 can be laid out in a straight run prior to feeding it into the housing 40 or it can be stored in coiled form or on a reel from which it can unwind as the mast is erected.

The housing 40 is also provided in its top wall 41 with a pair of spaced apart vertically disposed guide plates 55 between which the meshing chains 13, 14 pass as they exit from the housing 40 during the erection of the mast, the plates 55 guiding the chain assembly 11 vertically upwards. The plates 55 may be provided with freely rotating rollers 56 against which the chains rollingly engage as they pass therebetween.

The cog wheels 46 are, in this embodiment, rotated by a manually operated winding mechanism which includes a rotary crank handle 59 which carries at its drive shaft end a ratchet mechanism comprising a ratchet gear 60 and a double-acting pawl member 61. The gearing of the winding mechanism is via two gear reductions to the right hand side drive cog 62 (which drives the right hand side cog wheel 46) which itself is geared to the left hand side drive cog 64 (which drives the left hand side cog wheel 46) via two idler gears 65 so that it is kept rotating in the correct direction. The two gear reductions greatly facilitate the winding-up operation when carried out manually.

It has been found that the chain assembly 11 produced from the interengaging chains 13, 14 forms a rigid structure which is able to extend vertically over a significant distance without toppling under its own weight. Of course, depending on the height requirements of the mast 10, a guy securing system may be necessary in order to ensure that the mast is held securely in place, particularly to withstand wind loading forces. In this embodiment, the guy securing system forms an integral part of the winding mechanism of the mast 10 so that guys 66 are pulled out or retracted simultaneously with the raising or lowering of the mast 10. However, it will of course be appreciated that the guys can be secured in place by other means.

The guy securing system is shown in FIGS. 1 to 3 of the drawings and comprises a pair of rotatable guy storage drums 67, one to each side of the gear drive mechanism, each drum having a shaft 69 on one end of which is fixed a friction drive wheel 70, e.g. of polyurethane, the wheels 70 being interconnected by link rod 71 to operate same in unison. A control lever 73 is coupled to the guy drums 67 by means of coupler mechanisms 74 and connector bar 75 which interconnect the couplers 74, the lever 73 also being operatively coupled to the pawl 61 of the ratchet mechanism whereby actuation of the lever 73 selectively engages with the ratchet gear 60 so that in one position of engagement, the handle 59 can be rotated only in one direction, whilst in the other position of engagement, the handle 59 can be rotated only in the other opposite direction.

The lever 73 can thus be set in one of two operational positions. In one setting, the 'UP' position, the ratchet mechanism will allow the chain assembly 11 to be wound upwards only and the drive wheels 70 associated with the drums 67 are forced against their brake pads (not shown) whereby the upward movement of the chains 13, 14 causes the guys 66 to be pulled out from their drums 67, through slotted openings 76 in the top wall 41 of the housing 40, at a rate which matches the rate of ascent of the mast 10 which ensures that the mast 10 is held in a vertical position throughout its ascent.

When moved to the other setting, the 'DOWN' position, the lever 73 causes the drums 67, along with their drive wheels 70 to pivot, so that the drive wheels 70 make frictional contact against the faces of respective drive cogs 62, 64. In this position, the ratchet mechanism allows the chain assembly 11 to be wound in the down direction only, and rotation of the handle 59 (in the opposite direction) causes the cogs 62, 64 to rotate the wheels 70 to in turn rotate the drums 67 to pull in or retract the guys 66 as the mast is lowered. The ratio of the drive to the drums 67 is such that it always tries to pull in more guy rope 66 than is possible but slips on the drive cog 62, 64 to accommodate the varying rate of guy gathering as the mast descends.

In this embodiment, use is made of three sets of guys which connect between the mast 10 at different height locations and ground pegs 77, but it should be realised that the number of guys can be varied. Masts which extend to a height in the range of 18–20 meters may require up to four sets of guy ropes.

Although not shown in the drawings, the cables/wires leading to an antenna element (not shown) supported on top of the mast 10 can be conveniently housed within the chain assembly, the cables or wires extending along one or both of the lengths of chain 13, 14 interiorly thereof.

By its very nature, the mast assembly 10 constructed according to this invention, is extremely simple to repair "in situ" in that the links 17 of the link chains 13, 14 can be readily replaced should they be damaged during field operations.

It should be realised that the invention need not be restricted to an antenna support mast, and that it could be used in any situation where there is a need for an extendible rigid member to form an elongate support structure. The invention is not restricted to upward vertical elevation, as it will be equally suited to downward extension, or extension at any angle.

It should also be realised that the chain lengths may be interlocked by hand and not necessarily by a chain drive unit. Thus in field operations, where the drive unit may have been damaged and is non-operational, it will still be possible to erect the mast by hand.

It should also be realised that the links 17 of the chains 13, 14 need not mesh in the manner as described hereinbefore, but may, for example, simply interengage with one another in back to back relationship with cooperable interlocking members to restrain relative movement therebetween. The links may also have a cross-sectional shape which is circular, oval or aero-foil rather than rectangular.

A brief consideration of the above described embodiment will indicate that the invention provides for a very simple and efficient mast assembly which enables a support mast to be very quickly and easily erected and dismantled and which is far more reliable in its operation in comparison to known telescopic support mast structures.

The claims defining the invention are as follows:
We claim:

1. A self-supportive link chain formed by a length of pivotally interconnected identical link elements which are arranged to mesh with identical link elements of a separate length of link chain, wherein each said link element comprises:
   a pair of opposed side plates spaced from each other with each said side plate provided with an inwardly projecting tooth flanked by two half meshing voids;
   a web interconnecting said side plates;
   a pair of side flanges offset from said pair of opposed side plates, with each said side plate attached to one said side flange wherein one end of said side plate forms a shoulder adjacent said attached side flange;
   a first pivot means on said pair of side flanges; and
   a second pivot means on said pair of side plates;
   wherein said first pivot means is coupled to a second pivot means of an adjacent link element such that each said shoulder abuts against a top surface of a side plate of said adjacent link element to prevent rotation of said link element in a first direction about a pivot axis of said first pivot means;
   wherein each said side flange abuts against an inner surface of a side plate of said adjacent link element preventing movement of said link element relative to said adjacent link element in a direction parallel to said pivot axis; and
   wherein each said projecting tooth is received in a meshing void which is formed by adjacent half meshing voids of adjacent side plates of adjacent link elements of said separate length of link chain, and said meshing void is shaped complementary to said projecting tooth.

2. The self-supportive link chain according to claim 1 wherein said offset is equal to a thickness of said side plate.

3. The self-supportive link chain according to claim 1 wherein each said link element further includes a curved, transverse rail extending between said side plates, said transverse rail having an inclined upper edge, an oppositely inclined lower edge, and a pair of raised abutment surfaces on opposed sides of said transverse rail; wherein said upper edge of said transverse rail of said link element abuts against a lower edge of a transverse rail of a link element of said separate length of link chain and each said raised abutment surface matingly engages with an inner surface of a side plate of said link element of said separate length of link chain.

4. The self-supportive link chain according to claim 3 wherein each said link element further includes a plurality of support webs interconnecting said web and said transverse rail.

5. An extendible column comprising:
   a pair of link chains, each said link chain formed by a length of pivotally interconnected identical link elements which are arranged to mesh with identical link elements of the other of said pair of link chains, each said link element including a pair of opposed side plates spaced from each other with each said side plate provided with an inwardly projecting tooth flanked by two half meshing voids, a web interconnecting said side plates, a pair of side flanges offset from said pair of opposed side plates, with each said side plate attached to one said side flange wherein one end of said side plate forms a shoulder adjacent said attached side flange, a first pivot means on said pair of side flanges, and a second pivot means on said pair of side plates, wherein said first pivot means is coupled to a second pivot means of an adjacent link element such that each said shoulder abuts against a top surface of a side plate of said adjacent link element to prevent rotation of said link element in a first direction about a pivot axis of said first pivot means, and wherein each said side flange abuts against an inner surface of a side plate of said adjacent link element preventing movement of said link element relative to said adjacent link element in a direction parallel to said pivot axis, and wherein each said projecting tooth is received in a meshing void which is formed by adjacent half meshing voids of adjacent side plates of adjacent link elements of said other link chain, and said meshing void is shaped complementary to said projecting tooth; and
   chain drive means engageable with said pair of link chains to couple said link chains into interengagement and extend said column when said drive means is driven in a first direction and to uncouple said pair of link chains when driven in a second direction.

6. An extendible column assembly according to claim 5 wherein said link elements of said chains, when interengaged, are in meshing relationship.

7. An extendible column assembly according to claim 5 wherein said chain link elements of each said chain are moulded of plastics material.

8. An extendible column assembly according to claim 7 wherein said plastic material is a fibre reinforced composite.

9. An extendible column assembly according to claim 5 wherein said drive means comprises a manually operated gear drive unit housed in a housing located at a foot of said column, said gear drive unit comprising a pair of driven cog wheels mounted for rotation about respective horizontal axes on said housing, each said cog wheel being arranged to mesh with said link elements of a respective said chain whereby, upon rotation of said cog wheels, said link elements intermesh as said link elements pass upwardly between said cog wheels.

10. An extendible column assembly according to claim 9 wherein said housing comprises mutually opposite horizontal guide passages extending inwardly from opposite ends of said housing, and through which said link chains are guided during the railing or lowering of said column, each said guide passage terminating at its inner end in a ramp surface for guiding a leading link element of each said chain upwardly between said cog wheels, said ramp surfaces being effective to separate said link elements of said intermeshing chains upon downward travel of said chains.

11. An extendible column assembly according to claim 9 wherein said gear drive unit comprises a ratchet mechanism drivingly coupled to a gear train for transmitting drive to each said cog wheel, said gear train including at least one gear reduction.

12. An extendible column assembly according to claim 11 wherein said ratchet mechanism, in one mode of operation of said drive means, allows said chains to be driven upwards only, whilst in another mode of operation, permits said chains to be driven in an opposite downwards direction only.

13. An extendible column assembly according to claim 12 further comprising guy securing means housed within said housing and operatively associated with said drive means so that upon raising of said column, said guys are simultaneously dispensed from respective reels rotatably carried by said housing.

* * * * *

UNITED STATES PATENT AND TRADEMARK OFFICE
CERTIFICATE OF CORRECTION

PATENT NO. : 5,347,770
DATED : September 20, 1994
INVENTOR(S) : Michael P. McDonnell and Johannes J. W. Althoff It is certified that error appears in the above-indentified patent and that said Letters Patent is hereby corrected as shown below:

Column 1 Line 10 "invention-will" should read --invention will--.

Column 1 Line 15 after "to" insert --be--.

Column 5 Line 21 after "13," insert --14--.

Claim 8 Line 8 Column 9 "plastic" should read --plastics--.

Claim 10 Line 24 Column 9 "railing" should read --raising--.

Signed and Sealed this

Fifteenth Day of November, 1994

Attest:

BRUCE LEHMAN

Attesting Officer

Commissioner of Patents and Trademarks